(12) United States Patent
Sheasby et al.

(10) Patent No.: US 6,539,163 B1
(45) Date of Patent: Mar. 25, 2003

(54) NON-LINEAR EDITING SYSTEM AND METHOD EMPLOYING REFERENCE CLIPS IN EDIT SEQUENCES

(75) Inventors: Michael C. Sheasby, Montreal (CA); Andrew Skowronski, Montreal (CA); Thomas Peter Nadas, Montreal (CA)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/292,836

(22) Filed: Apr. 16, 1999

(51) Int. Cl.$^7$ ................................................. H04N 5/93
(52) U.S. Cl. ............................................ 386/52; 386/55
(58) Field of Search ............................. 386/52, 55, 53, 386/64, 46, 92, 95, 4, 1; 707/501.1; 360/13, 32; H04N 5/93

(56) References Cited

U.S. PATENT DOCUMENTS

| | | | |
|---|---|---|---|
| 5,126,851 A | * | 6/1992 | Yoshimura et al. |
| 5,237,648 A | * | 8/1993 | Mills et al. |
| 5,568,275 A | * | 10/1996 | Norton et al. |
| 5,682,326 A | | 10/1997 | Klinger et al. ........... 364/514 A |

FOREIGN PATENT DOCUMENTS

| | | | |
|---|---|---|---|
| WO | WO 99 54879 A | 10/1999 | |
| WO | WO 99/54879 | 10/1999 | ......... G11B/27/034 |

OTHER PUBLICATIONS

Alpert et al: "The EFX Editing and Effects Environoment", IEEE Multimedia, US, IEEE Computer Society, Oct. 1, 1996, pp. 15–29.

* cited by examiner

*Primary Examiner*—Robert Chevalier
(74) *Attorney, Agent, or Firm*—Peter J. Gordon

(57) ABSTRACT

A novel NLE system and method of constructing edit sequences includes reference clips which can be employed in the sequences. The reference clips include a reference to metadata defining a child sequence. The reference clip is loaded into a parent sequence in the NLE system, rather than the netadata for the child sequence and, as the reference clip and its reference typically have a much smaller memory footprint than the metadata for the child sequence, the memory requirements for the NLE system to load the parent sequence are reduced, as is the time required to accomplish the load. In addition, the metadata defining the child sequences can be persisted separately from the parent sequences, and used in a any parent sequence by employing a reference clip to the persisted child sequence. This also allows multiple instances of reference clips to a child sequence to be employed, in a single parent sequence or in multiple parent sequences and by multiple users. New versions of a child sequence can be automatically employed in any subsequent playback of a parent sequence which contains a reference clip referring to the child sequence. Further, access control, security, and version control can employed with the persisted child sequences.

12 Claims, 5 Drawing Sheets

NON-LINEAR EDITING SYSTEM AND METHOD EMPLOYING REFERENCE CLIPS IN EDIT SEQUENCES

FIELD OF THE INVENTION

The present invention relates to non-linear editing systems. More specifically, the present invention relates to non-linear editing systems which provide reference clips to be employed within edit sequences.

BACKGROUND OF THE INVENTION

Non-linear editors (NLE's) are well known and examples include the SOFTIMAGE/DS and AVID Media Composer products sold by the assignee of the present invention. Such systems are timeline-based where clip objects representing the material being edited are positioned and manipulated with respect to a timeline to create an output sequence for the work being created. Conventional NLE systems have permitted video, computer generated graphics, audio and, indirectly, film media to be edited and various effects to be applied to the media.

One of the challenges with NLE systems is the amount of the data which must be managed by the system. For example, a typical sequence will include many clip objects, including: a variety of video clips, representing different video sources; a variety of audio clips, again representing different audio sources; a variety of effects clips, applied at different times to different ones of the audio and video clips; and a variety of clips such as those representing animation curves for effects, parameters relating to compositing, paint strokes, etc. Even a sequence producing just a few minutes of playback can have hundreds of clip objects defined for it, those clip objects being inter-related in complex manners. Accordingly, the storage space required for the clip objects and their inter-relationships, referred to collectively herein as "metadata", of a sequence constructed with an NLE system can quickly become very large. At the same time, it is desired to provide an interactive editing environment wherein a user can interact with a sequence and/or view the results of changes made to the sequence in real time and thus the metadata for a sequence is typically read into RAM memory to provide the necessary fast access.

However, this requires large amounts of RAM and, due to the size and complexity of the metadata, loading a sequence into an NLE system can require a significant period of time.

SUMMARY OF THE INVENTION

It is an object of the present invention to provide a novel NLE system for, and method of, constructing sequences which obviates or mitigates at least one of tie disadvantages of prior art NLE systems.

According to one aspect of the present invention, there is provided a method of constructing a sequence in an non-linear editing system, comprising the steps of:
(i) constucting a set of metadata defining a child sequence providing at least one output stream of data:
(ii) storing said metadata defining said child sequence such that it is persisted;
(iii) creating at least one reference clip for placement in a parent sequence, said at least one reference clip including a reference to said child sequence and to at least a selected one of said at least one output stream of data;
(iv) placing said at least one reference clip in a parent sequence such that said metadata defining said child sequence is not loaded into memory prior to playback of said parent sequence, but during playback of said parent sequence, at least said selected one of said at least one output streams of data is included in said playback.

According to another aspect of the present invention, there is provided a non-linear edit system, for constructing an edit sequence, comprising:
at least one processor;
a user input means operable to receive input from a user and provide said input to said at least one processor, said input comprising the definition of metadata to define a child sequence including at least one selected output;
storage means to store said metadata defining said child sequence;
output means to display a clip object representing said child sequence to said user, said user selecting and placing said clip object in said edit sequence with said input means;
playback means to output the result of said edit sequence including said child sequence, said playback means not loading said metadata defining said child sequence but including said at least one selected output in said playback.

The present invention provides an NLE system and method of constructing sequences which employs reference clips. Reference clips are employed in a parent sequence like conventional clip objects but include a reference to a persisted child sequence and do not require the loading of the child sequence into memory. As the reference in the reference clips is much smaller in size than the metadata defining the child sequence, an often significant reduction in the amount of memory required to load the parent sequence can be obtained, as can a significant reduction in the time required to load the parent sequence as its complexity and size is reduced.

In addition, the present invention allows child sequences to be persisted separately from a parent sequence. This allows multiple instances of reference clips for a child sequence to be employed in a parent sequence, or in two or more parent sequences. This also allows versioning and version control of child sequences, as well as novel representations of sequences at varying levels of detail, and interoperaion with toolsets that work with one type of data to produce an output stream.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
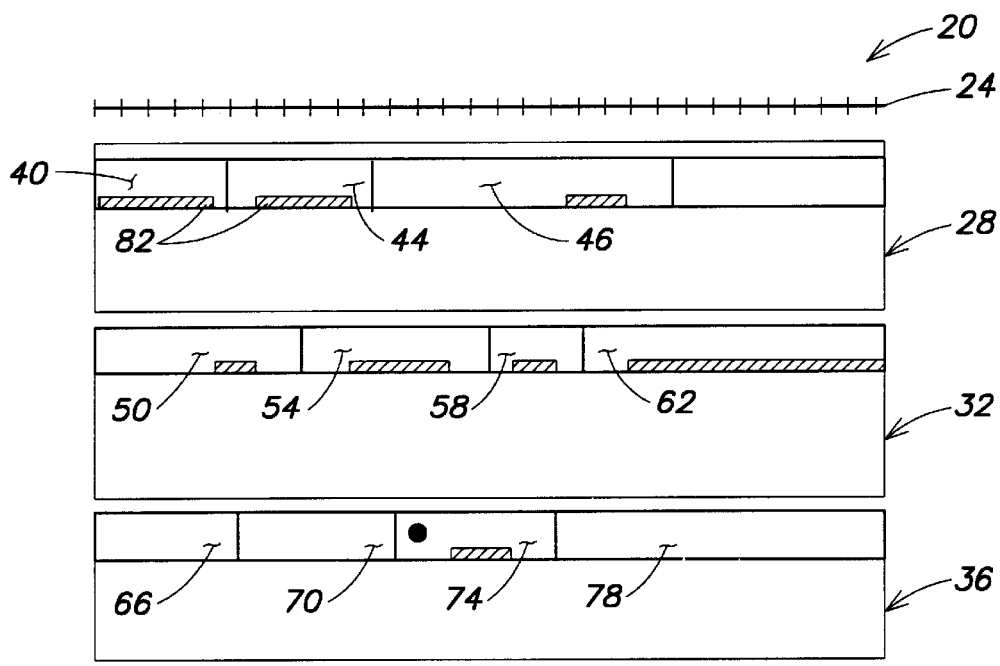
FIG. 1 shows a schematic representation of an edit sequence in an NLE system.

FIG. 1 shows a schematic timeline representation of a conventional NLE system sequence 20 which includes a time index ruler 24 and three tracks 28, 32 and 36. In the example shown: track 28 include three clips, 40, 44 and 46; track 32 includes four clips, 50, 54, 58 and 62; and track 36 includes four clips, 66, 70 74 and 78. In this example, tracks 28, 32 and 36 can represent video, whether captured off of tape or film or produced by computer, or audio out streams and each clip included in any one of these tracks will be of a corresponding type, i.e.—tracks 28 and 32 include video clips and track 36 includes audio clips, etc. Each track 28, 32 and 36 can also include various appropriate effects (not shown) such as dissolves, blurs, reverbs, jitters, etc. as desired, which are applied to clips. The duration, if any, of each clip which is "active", i.e.—contributing to the output stream of the track, is indicated by an activity bar 82.

Figure 2:
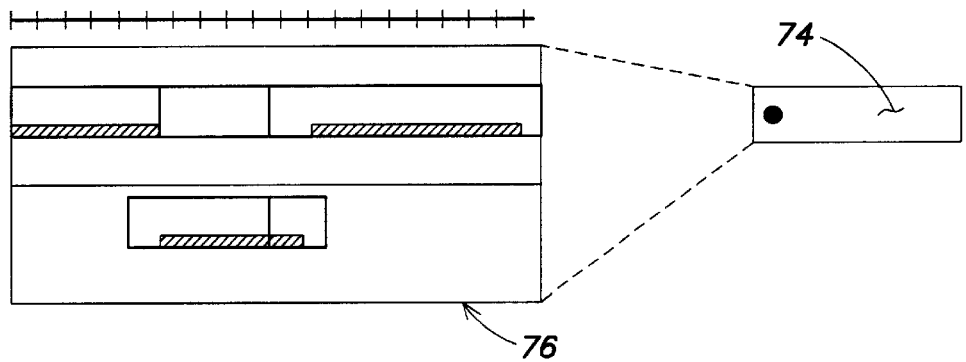
FIG. 2 shows a schematic representation of a conventional container clip employed in the sequence of FIG. 1 and the sequence of clips which are nested within the container represented by the container clip.

To simplify the complexity of a sequence 20, known NLE systems such as the above-mentioned SOFTIMAGEDS system, provide container clips which provide access to nested sequences of clips and/or effects. In the example of FIG. 1, clip 74 is a container clip, as indicated by the "●" at die upper left had side of the clip representation in the user interface. FIG. 2 shows the sequence of the five clips which are nested within the container 76, represented in the NLE system by container clip 74. Essentially, containers allow clips of the same data type (video, audio or computer generated images, etc.) in a track of a sequence to be "collapsed" such that they are represented by a single object within the user interface of the parent sequence. In fact, a container can include other containers of the same data type to further simplify the representation of the sequence presented to the user at any one time. This allows sets of clips, perhaps spanning multiple tracks, within a sequence to be represented in a hierarchical, nested, manner which is often simpler for a user to comprehend and interact with. A more complete description of container clips is provided in the SOFTIMAGEIDS V1.0 User's Guide, copyright 1997, at pages 350 through 358, and the contents of this publication are incorporated herein by reference.

Typically, a user will combine clips in one or more tracks that have a conceptual inter-relationship to be represented by a container clip. If the user wishes to alter or view the sequence nested with a container clip, the container clip can be expanded, through any suitable user interface operation such as a double-click on the container clip within the user interface Once expanded, the sequence of clips nested within the container, whether container clips or other clips, are displayed to the user and these clips can then be interacted with in the same manner as any other clip in a sequence.

In conventional NLE systems, when a sequence such as that illustrated at 20 in FIG. 1 is constructed and/or loaded by a user, the metadata defining each clip and container clip, and their interrelationships, is loaded into memory. For the extremely simple example of FIGS. 1 and 2, metadata for a total of fifteen clips would be loaded for sequence 20. As mentioned above, this loading can require the presence of a significant amount of memory in the NLE system and can require substantial periods of time to accomplish for complex sequences, as the interrelationships must be setup within the NLE system.

The present invention employs child sequences, which are a collection of persisted metadata defining a sequence. Unlike the metadata in container clips, a single child sequence can contain different data types, and therefore can produce output streams of different data types.

The present inventors have determined that it is often not necessary to load all of the metadata held within a child sequence when a user wishes to work on a parent sequence. Specifically, a user typically only works on a portion of a sequence at any one time. Accordingly, the present inventors have developed an NLE system which provides reference clips and these clips can be employed to reduce the amount of metadata which must be loaded into memory when a sequence is loaded. The NLE system and reference clips of the present invention also allow users to interact with the sequence in an advantageous manner.

A reference clip is a clip object that can be manipulated in the same manner as any other clip object in the NLE sequence. However, a reference clip does not represent media, but instead comprises a reference to at least one output stream of another sequence. When a sequence employs a reference clip which refers to another sequence, the sequence containing the reference clip is referred to herein as the parent sequence and the sequence which is referred to by the reference clip is referred to as the child sequence. As is discussed in more detail below, a child sequence can have several, one or no parent sequences. In a present embodiment of the instant invention, reference clips always refer to a child sequence, however in the degenerate case, the child sequence can be empty, producing a predefined default output stream such as a gray video screen or a constant audio tone, or can contain only a single clip.

Figure 3:
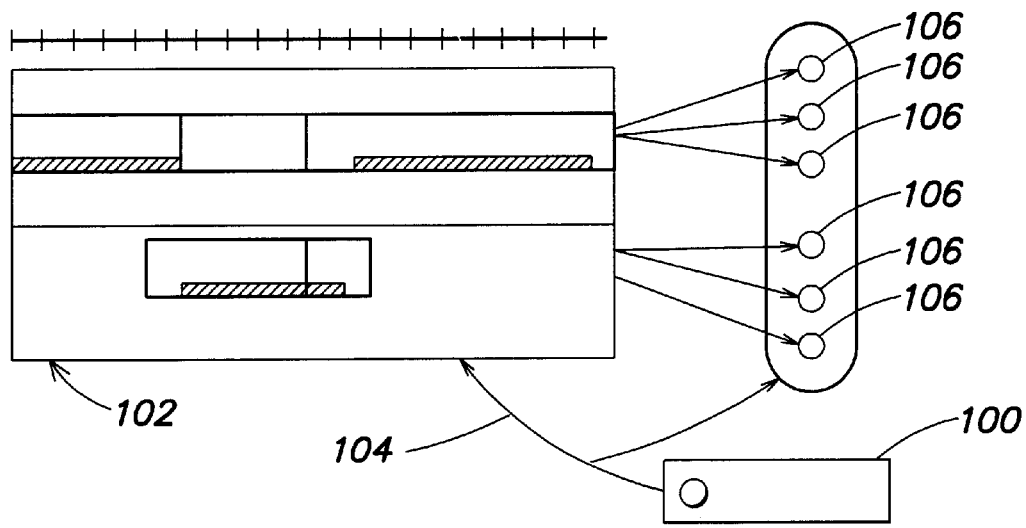
FIG. 3 shows a schematic representation of a reference clip which refers to a child sequence in accordance with the present invention.

FIG. 3 shows a reference clip 100 which refers to child sequence 102 As shown, reference clip 100 can provide the user with an indicator, such as the illustrated "○", within the user interface that it is a reference clip. In fact, whether a clip is a container clip or a reference clip can largely be transparent to a user.

Reference clip 100 includes a reference 104 to the underlying child sequence 102 that it represents. Reference 104 identifies the particular child sequence 102, defined by the metadata of interest, and the location of that child sequence 102. Reference 104 also identifies the particular output steam or streams 106 which are desired, from the output streams available from child sequence 102. As discussed below, these streams 106 can be selected by the user or selected by an appropriate default when a reference clip is created.

Unlike conventional NLE systems, in the NLE system of the present invention when a parent sequence which contains reference clips 100 is read in to memory, the NLE system only reads into memory the appropriate reference 104 for each reference clip 100 in the parent sequence. As references 104 are much smaller than the metadata defining the child sequences 102 they refer to, the memory requirements and loading times for the parent sequence are greatly reduced, A reference clip 100 can have one of two states, loaded or unloaded. If the metadata representing the child sequence 102 of clips and/or effects referred to by a reference clip 100 are in memory, the reference clip 100 is in the loaded state. Conversely, if the metadata representing the child sequence 102 of clips and/or effects referred to by a reference clip 100 are not in memory, the reference clip 100 is in the unloaded state.

A reference clip 100 is implicitly put into the loaded state when a user expands the clip to access the child sequence 102 it refers to. Alternatively, the user can manually request that a given reference clip be loaded via an appropriate user interface action, such as choosing "load reference" from a contextual menu on that reference clip. In a present embodiment of the invention, in such a case the child sequence 102 referred to by the reference clip 100 replaces the parent sequence in the timeline editing window in which the parent sequence was being edited. Once the user has finished viewing or modifying the child sequence 102 referred to by reference clip 100, the child sequence 102 is again saved, as described below, and closed. At any time, the user can navigate back to the parent sequence by a suitable user interface action, such as clicking on an icon representing the parent sequence within the interface.

The metadata defining a child sequence 102 referred to by a reference clip 100 is only read into memory when the user navigates into the reference clip 100 or explicitly requests that it be loaded. As will be apparent, when a reference clip 100 is in the loaded state, it requires at least the same memory resources as the metadata defining the child sequence 102 and no memory requirement reduction is obtained. However, as the metadata defining the child sequence 102 is only loaded when and/if reference clip 100 is navigated into by a user, in general a significant savings is obtained.

In addition to the advantages in reducing memory requirements and the decreased time required to read a parent sequence into memory, references clips 100 provide another significant advantage in that the child sequences 102 they reference can be separately persisted and/or instanced multiple times. In conventional NLE systems, the metadata for a portion of a sequence, including the metadata nested within a container clip, are embedded within the sequence and must be loaded into memory as a whole. Further, if the portion of a sequence represented by a container clip is repeated in a sequence, the metadata contents nested within the container is loaded into memory for each time they are used in the sequence, i.e.—using the container twice results in the metadata being loaded into memory twice, etc.

In contrast, in the present invention the metadata define any child sequence 102 can be separately persisted. As used herein, the term persisted is intended to comprise any suitable method of storing a child sequence 102 to data storage mechanisms including formats such as magnetic storage, optical storage, RAM and/or distributed storage schemes The metadata defining a child sequence 102 is stored separately from any parent sequence and can be presented to the user by a clip object in a conventional clip browser, to be incorporated into one or more parent sequences as desired.

Figure 4:
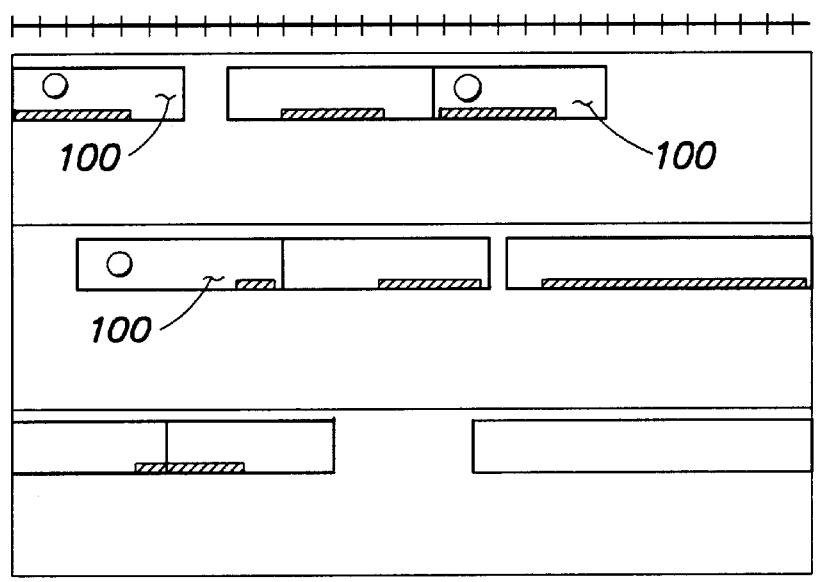
FIG. 4 shows a schematic representation of a parent sequence employing multiple instances of the reference clip of FIG. 3.

FIG. 4 shows an example wherein a parent sequence employs three instances of a single reference clip 100. As will be apparent to those of skill in the art, each instance can have a different duration, for example the first instance can be a reference clip with a ten second duration, the second a reference clip with a twenty second duration, etc. Moreover, effects can be applied to different ones of the instances of a reference clip 100 and the application of the effect is performed on the selected output steam from the child sequence. Thus an effect applied to one instance of a reference clip will not affect the output of another instance of a reference.

As mentioned, the parent sequence does not load three copies of the metadata of child sequence 102. Instead, the persisted copy is merely referenced, by the references 104 of each reference clip 100, and a single instance of that persisted copy is only loaded if and when necessary.

The use of reference clips 100 and the separate persistence of child sequences 102 which it allows provides additional advantages. Specifically, a child sequence 102 can be accessed by more than one user and/or in more than one parent sequence, merely by including a reference clip 100 to the desired child sequence 102 in each parent sequence. For example, standard child sequences 102 such as the Tag Screen titles for a production company can be stored once and referred to in many parent sequences where they are composited onto another video signal. Further, if the metadata defining a child sequence 102 is modified after one or more reference clips 100 to that child sequence 102 have been employed in a parent sequence, the next time the parent sequence is played, the modified metadata of the child sequence 102 will be used. This allows, for example, revisions to be made to child sequences 102 without requiring the separate modification of a parent sequence.

Also version control, access control and security systems can be employed with reference clips 100. The user responsible for the construction of a particular child sequence 102 can define other users' rights to the child sequence to be read-only, read-write, read-write-delete, etc. to allow appropriate users to access, modify and/or delete the child sequence. Also, a suitable access control system, such as a file locking system can be employed to prevent other users from accessing the child sequence while the responsible user is storing the latest version, etc.

Moreover, the user can control the release of versions of that sequence. For example, a first rough cut at a video sequence assembled as a child sequence 102 can be separately stored and the responsible user can then release that stored version for referencing by other users via reference clips 100, presented in the NLE system's clip browser. As the responsible user produces subsequent versions of that child sequence 102, those versions cm be "published" to replace the earlier versions. Each time this occurs, the next time a parent sequence which includes a reference clip 100 referring to that child sequence 102 is played, the latest version of that child sequence 102 released by the responsible user will be included in the playback. In the simplest case, this is accomplished by replacing the earlier version of the child sequence with the newer version at the same storage location. As each reference 104 of a reference clip 100 stores the location of the metadata for the child sequence, replacing the child sequence with the newer version in effect publishes the newer version for use by all reference clips that referred to the original version. Alternately, each version can be made available to users to allow them to select the version they wish to use.

When a user wishes to play a timeline containing one or more reference clips 100, the NLE system produces the playback in the appropriate manner, depending upon the state of the reference clips 100, the data type and whether the output stream 106 selected by the reference clip 100 has previously been rendered, if necessary, and is available in cache. For example, for a reference clip 100 referring to a child sequence 102 for a sequence of video data which contains no effects that cannot be rendered in real time, the data for child sequence 102 will be read from storage and processed in the conventional manner during playback. If the metadata for that child sequence 102 defines an effect that cannot be rendered in real time, but which has previously been rendered and stored in the NLE system cache and referred to by the metadata for child sequence 102, the required data will be read from the cache and/or storage during playback.

If the metadata for child sequence 102 defines an effect that cannot be rendered in real time or which requires other data which cannot be rendered in real time, and which has not previously been rendered and stored, the NLE system can indicate to the user the existence of unprocessed data, prior to commencing playback allowing the user to render the missing required data before playback. If the user processes the child sequence from the parent sequence, the reference clip 100 is changed to the loaded state by loading the metadata of child sequence 102 and any toolset required to perform the rendering is also loaded. The required data is then rendered and stored in the system cache, or elsewhere, and the playback is subsequently performed. Alternatively, a separate process can be spawned to process the child sequence, potentially on another machine. The metadata for child sequence 102 can be unloaded, once rendering is complete, if the user desires.

Unprocessed material, as elsewhere in the NLE system, will be replaced with a default output, such as a still video frame stating "Processing Required" or a default audio signal which acts essentially as a placeholder, until the required data is subsequently rendered. In this manner, a user can play portions of a parent sequence while omitting other portions or components of the sequence which might require significant time to render and which are not yet available for playback.

It is also contemplated that reference clips 100 can advantageously be employed, when creating a parent sequence, as placeholders for data which is not yet available. For example, a computer generated special effects sequence may not be available when the director of a work begins assembling a rough cut of the parent sequence. In such a case, the director can employ a reference clip 100 with the desired duration as a placeholder in the parent sequence, such placeholder clips referring to an empty child sequence 102. Once the empty child sequence 102 has clips added to it, they will be included in playbacks of the parent sequence. Further, reference clips 100 allow storyboading and/or other high level editing modes to be easily employed.

In the present invention, a user can construct a reference clip 100 by at least two techniques. In the first technique, the user creates a sequence and persist it as a child sequence 102 which appears to the user in a clip browser. When the user wishes to employ a reference clip 100 to that child sequence 102, the user selects the child sequence 102 in the browser and, by a suitable user interface event, indicates that a reference clip 100 should be created for that child sequence 102 in the parent sequence. If necessary, a dialog box or some other UI mechanism is provided to allow the user to map at least one of output stream 106 available from the selected child sequence 102 to the parent sequence. When one or more output streams 106 are selected e reference clip 100, and its reference 104, shown in FIG. 3, are created and the user then positions the reference clip 100 as desired in the parent sequence, as shown in FIG. 4. It should be noted that, should a user subsequently wish to change one or more of the selected output streams 106 to another of the available output steams 105 of the child sequence 102, this is easily accomplished by updating in response to a suitable user interface event the reference 104 of the reference clip 100 to refer to the newly selected output stream 106. Additional instances of reference clips 100 for the same child sequence 102 can be created by repeating the selection and positioning process as desired.

In the second technique, the user can select a previously constructed container clip embedded within a sequence and indicate, via a suitable user interface event, that the metadata represented by that container clip is to be persisted as a separate child sequence 102. A suitable clip object is then placed into the clip browser for the new child sequence 102 and the container clip in the pant sequence is replaced by a reference clip 100 which includes a reference 104 to the child sequence 102. In this technique, the output stream or streams 106 of the reference clip 100 are mapped to the same output stream as the replaced container clip. As will be apparent to those of skill in the art the output stream selections can be subsequently modified by the user, if desired.

Conversely, a reference clip 100 in a sequence can also be converted into a conventional container clip, if desired. In such a case, the reference clip 100 is removed from the parent sequence and replaced by a container clip in which a copy of the metadata to define the sequence the reference clip referred to is nested. This metadata is loaded into memory with the metadata for all other, non-reference clips of the parent sequence.

Figure 5:
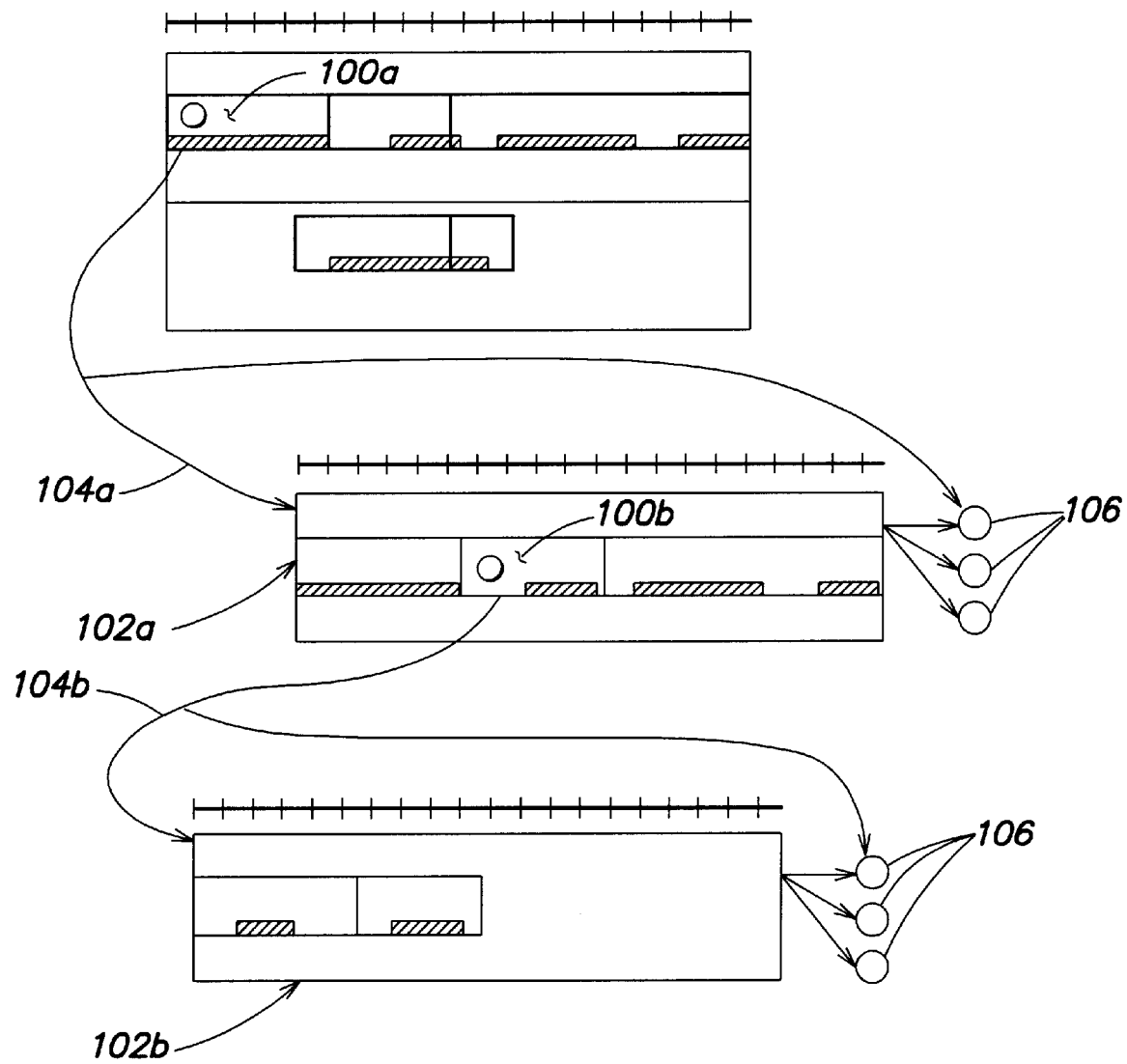
FIG. 5 shows an example of the hierarchical arrangement of parent and child sequences in accordance with the present invention.

The present invention allows the hierarchical arrangement and store of sequences. Specifically, a parent sequence can include a reference clip 100*a* which defines a reference 104*a* to a child sequence 102*a* which also includes a reference clip 100*b*. Reference clip 100*b* defines a reference 104*b*, in turn, to another child sequence 102*b*, as shown in FIG. 5. Thus, sequence 102*a* is a child of the parent sequence containing reference clip 100*a* and is a parent to sequence 102*b* which reference clip 100*b* refers to. This hierarchical arrangement of sequences can be expanded to as many levels as desired. By employing this hierarchical arrangement of sequences, parent sequences of high complexity and/or large size can be simply and efficiently loaded and operated on by the NLE system of the present invention. Further, sequences which would otherwise be difficult for a user to comprehend, due to their complexity, can be displayed to a user in a manner which is simple to understand, as only the desired level of detail and/or complexity need be displayed at any one time.

It is contemplated that, in most circumstances, a reference clip 100 will have the same defined properties (resolution, fame rate, sample rate, etc.) as the child sequence 102 to which it refers. However, it is also contemplated that in some circumstances the properties of a reference clip 100 can be selected to differ from those of the child sequence 102 to which it refers For example, it may be desired in some circumstances to convert a sequence from a twenty four frame per second rate (standard film rates) to the frames per second (standard NTSC television rates) or vice versa. In such a case, if the properties of the reference clip 100 are set to a different value than those of the child sequence 102 to which it refers, the necessary conversion or rendering will be performed in real time at playback, if possible, or rendered and cached appropriately.

Figure 6:
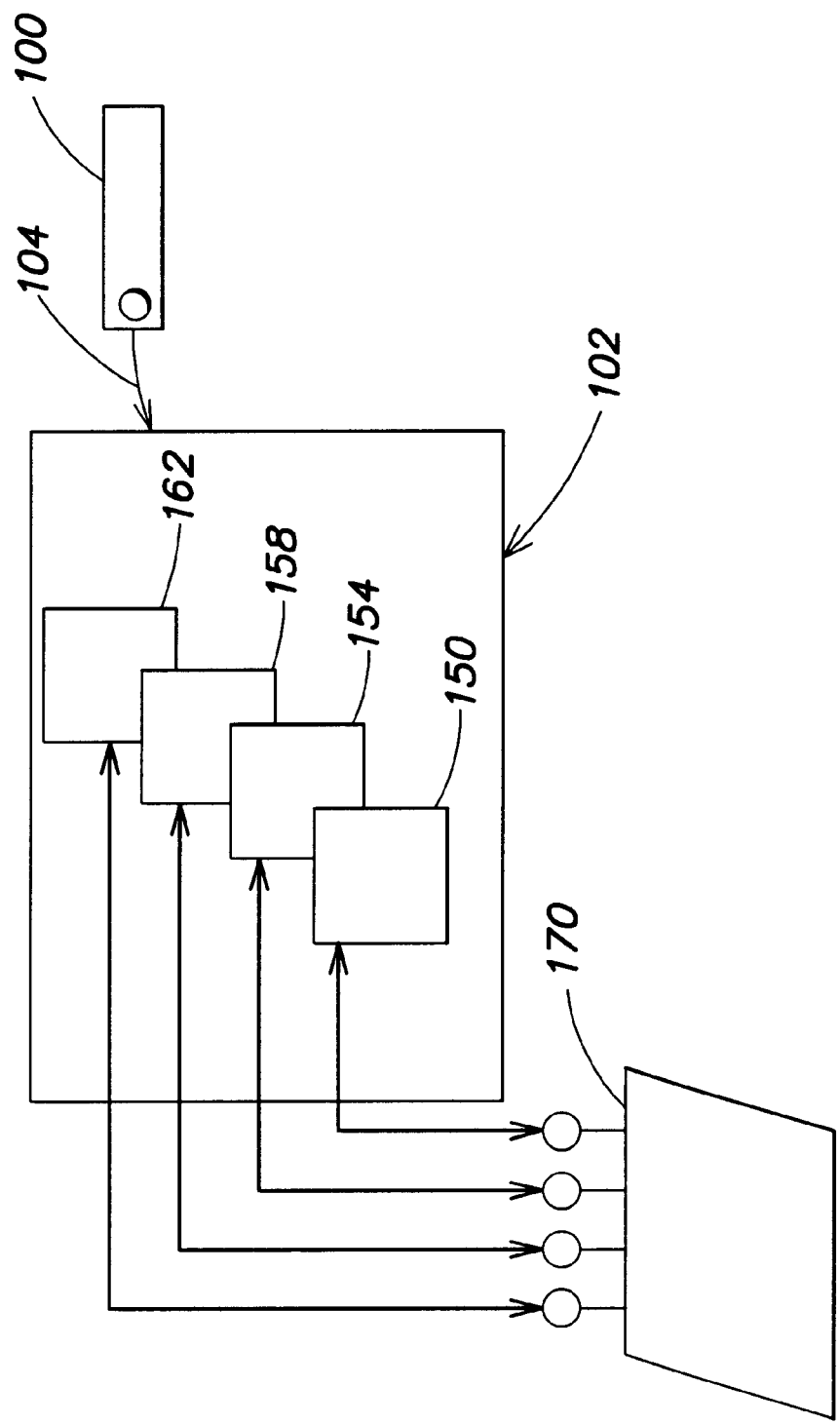
FIG. 6 shows a schematic representation of a child sequence including outputs for multiple passes and a composited output produced by a rendering and compositing system for a computer generated animation.

Another advantage of the present invention, as briefly discussed above, is that references 104 of reference clips 100 allow a user to navigate into the data underlying the metadata of a child sequence 102 and this allows interactive manipulation and production of the data of a clip. For example, FIG. 6 shows a child sequence 102 that has metadata for a compositing sequence which includes a set of reference clips 150, 154, 158, and 162 each of which refers to an output stream of computer generated animation data from a 3D scene 170. These streams can include the processed shadow passes, texture passes, specular highlight passes, etc. Clip 100 represents the final composited image wherein the separate rendering pass outputs are composited together by rendering and compositing sequence 102 to produce the final image.

With the present invention, a user can select any one of the available output streams, as desired, but can also navigate into any of 150, 154, 158, and 162 to access the animation and/or compositing data for the 3D scene which is operated on by rendering and compositing system 170 and any other related toolsets, such as modeling tools. This allows, for ample, a user to navigate into the 3D scene data to move a light source and to then have the specular highlights pass re-rendered. This produces a new version of the specular highlight pass output stream and the final composited pass. If either of these passes are an output stream presently referenced by reference 104 of reference clip 100, the new version or versions of these output streams will be employed the next time the parent sequence incorporating reference clip 100 is played.

Figure 7:
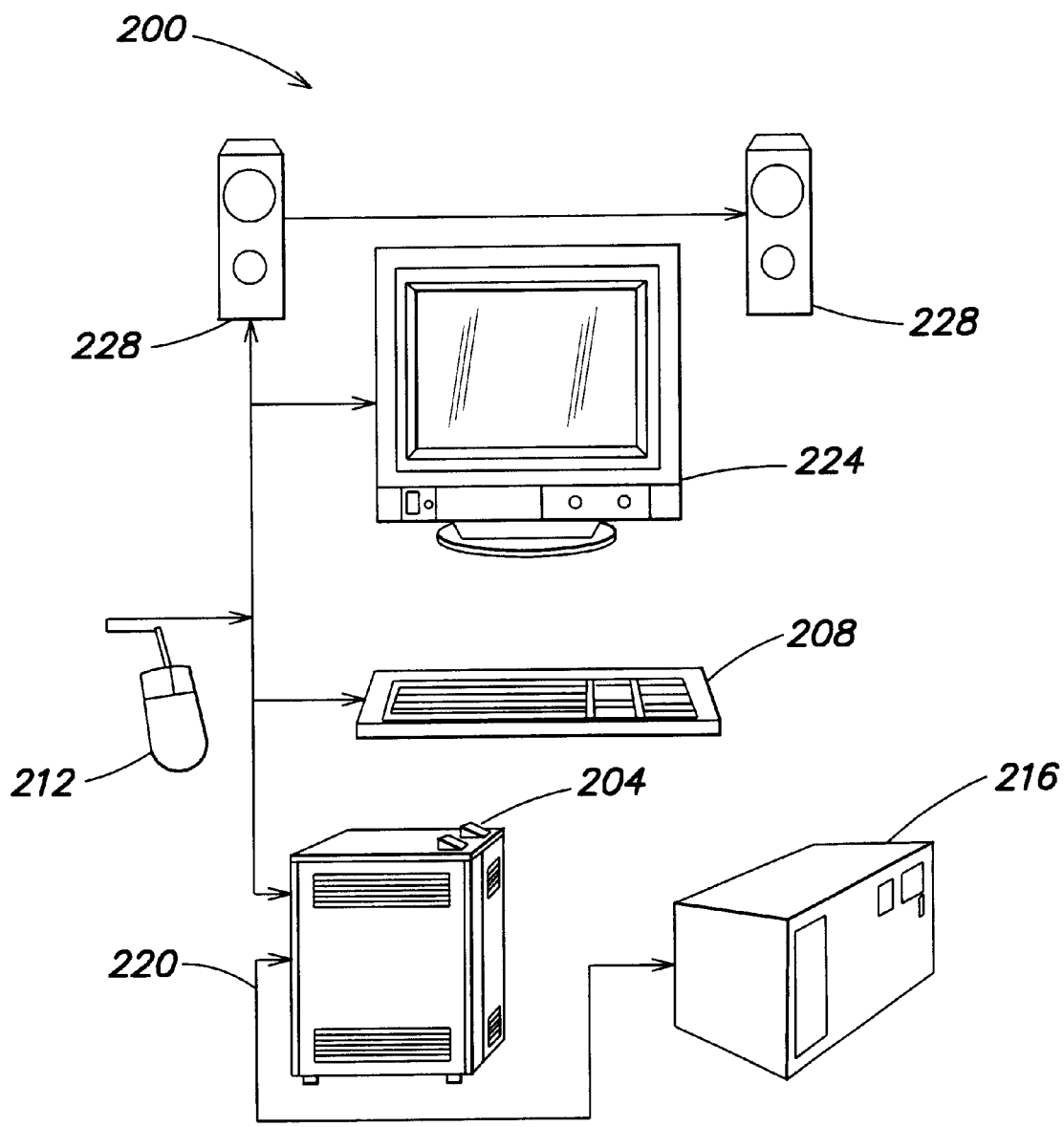
FIG. 7 shows an embodiment of an NLE system, in accordance with the present invention.

An embodiment of an NLE system, in accordance with the present invention, is indicated generally at 200 in FIG. 7. System 200 includes a computer processor system 204, which can be a general purpose computer system, such as an IBM PC compatible system with one or more Intel Pentium II's operating at 450 MHz, or a special purpose computer processor.

Processor system 204 executes the program implementing the NLE applications programs and any necessary operating system, for example Microsoft Windows NT. Processor system 204 communicates with a variety of user input devices, including a keyboard 208 and a pointing device, such as mouse 212.

Processor system 204 is also connected to one or more mass storage devices 216 such as a RAID array of magnetic disks which store media data, parent and child sequence metadata. Processor system 204 can also include one or more communications links 220 to access information, including metadata and media information, or to run other applications, such as rendering and/or compositing systems from remote or distributed mass storage devices and other systems. Communications links 220 can be Firewire, fiber optic, satellite or other suitable communications links, as will occur to those of skill in the art.

Output devices, including computer monitor 224 and audio speakers 228 can be connected to processor system 204, via appropriate I/O adapters (not shown) such as video graphics adapters and audio synthesizer adapters. These output devices, in combination with the above-mentioned user input devices, allow a user to interact with system 200 to create, modify and playback edit sequences.

The present invention provides an NLE system and method of constructing parent sequences which employ reference clips. These reference clips are employed in the parent sequences like conventional clip objects, and include a reference to metadata defining a child sequence, but do not require the loading of the metadata into memory. As the reference in the reference clips is much smaller in size than the metadata define the child sequence, an often significant reduction in the amount of memory required to load a parent sequence can be obtained, as can a significant reduction in the time required to load the parent sequence. In addition, the present invention allows child sequences to be persisted separately from a parent sequence. This allows multiple instances of reference clips for a child sequence to be employed in a parent sequence, or in two or more parent sequences. This also allows security, access and version control of reference container contents to be provided and allows the creation of hierarchical sequences wherein a child sequence of a parent sequence can, in turn, be a parent sequence to another child sequence.

The above-described embodiments of the invention are intended to be examples of the present invention and alterations and modifications may be effected thereto, by those of skill in the art, without departing from the scope of the invention which is defined solely by the claims appended hereto.

We claim:

1. A method of constructing a sequence in an non-linear editing system comprising the steps of:
   (i) constructing a set of metadata defining a child sequence, said metadata providing at least one output stream of data;
   (ii) storing said metadata defining said child sequence such that it is persisted;
   (iii) creating at least one reference clip for placement in a parent sequence, said at least one reference clip including a reference to said child sequence and to at least a selected one of said at least one output stream of data;
   (iv) placing said at least one reference clip in a parent sequence such that said metadata defining said child sequence is not loaded into memory prior to playback of said parent sequence, but during playback of said parent sequence, at least said selected one of sad at least one output streams of data is included in said playback.

2. The method of claim 1 further comprising the step of receiving from a user an indication that editing of said child sequence referenced by said reference clip is desired and loading said metadata defining said child sequence into memory for editing by a user.

3. The method of claim 2 wherein, once editing of said metadata defining said child sequence is completed, said edited metadata is stored as a new version of said child sequence.

4. The method of claim 1 where in step (iv) at least two reference clips referring to said child sequence are placed in said parent sequence.

5. The method of claim 1 further comprising step (v) wherein a second reference clip referring to said child sequence is placed in a second parent sequence such that said metadata defining said child sequence is not loaded into memory prior to playback of said second parent sequence, but during playback of said second parent sequence, at least said selected one of said at least one output streams of data is included in said playback.

6. The method of claim 1 where in step (i) said child sequence includes at least one clip that is a reference clip referring to a second child sequence.

7. The method of claim 1 where in step (i) said child sequence contains no clips and said at least one selected output stream is a predefined default stream for empty child sequences and in step (iv) said at least one reference clip is placed in said parent sequence as a placeholder.

8. The method of claim 1 where in step (ii) said metadata defining said child sequence is saved within a security control system which stores a set of access rights for each user accessing said child sequence.

9. The method of claim 1 where in step (ii) said metadata defining said child sequence is saved within an access control system which prevents access to said metadata by a first user when a second user has blocked access to said metadata.

10. The method of claim 1 where, for each set of metadata defining a child sequence, a clip object is displayed in a clip browser to allow a user to select said child sequence for inclusion in a parent sequence.

11. The method of claim 1 wherein said metadata includes references to data utilized to create said at least one output stream and wherein upon receiving from a user an indication that editing of said child sequence is desired, said data and an appropriate tool to operate on said data are loaded for use by said user to edit said data and to produce a new output stream.

12. A non-linear edit system, for constructing an edit sequence, comprising:

at least one processor, a user input means operable to receive input from a user and provide said input to said at least one processor, said input comprising the definition of metdata to define a child sequence including at least one selected output;

storage means to store said metadata defining said child sequence;

output means to display a clip object representing said child sequence to said user, said user selecting and placing said clip object in said edit sequence with said input means;

playback means to output the result of said edit sequence including said child sequence, said playback means not loading said Metadata defining said child sequence but including said at least one selected output in said playback.

\* \* \* \* \*